United States Patent Office 3,120,704
Patented Feb. 11, 1964

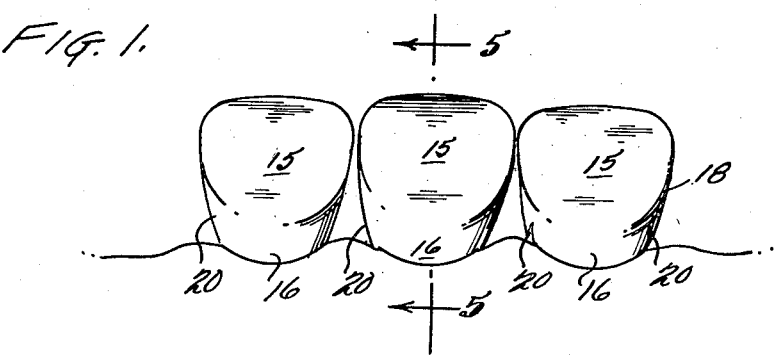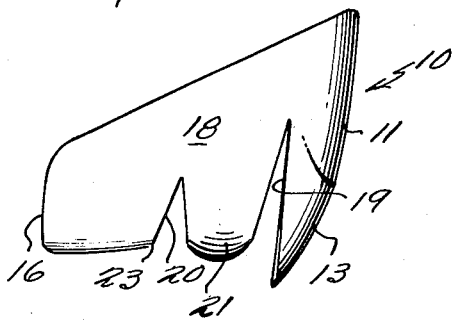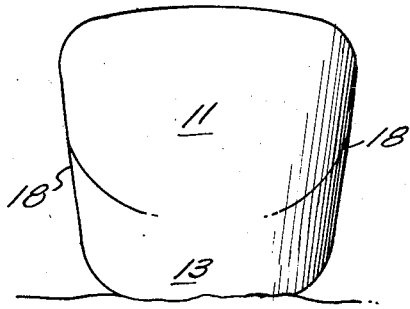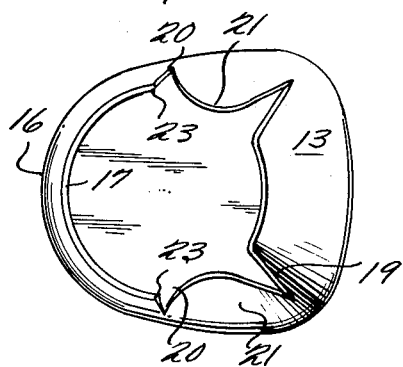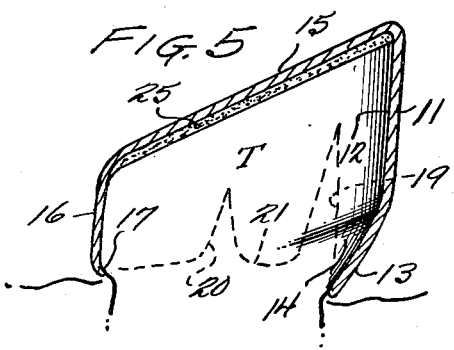

3,120,704
CROWN FOR BOVINE TEETH
Ward C. Newcomb, Chappell, Nebr.
Continuation of application Ser. No. 46,531, Aug. 1, 1960. This application Apr. 17, 1962, Ser. No. 189,238
5 Claims. (Cl. 32—12)

A primary object of this invention is the provision of an improved protective metal cap or crown for positioning over the lower incisor teeth of cattle or sheep to protect the teeth and stop the abrasion occasioned by sand and hard grasses on the biting surface of the teeth.

The invention is particularly applicable to preventive dentistry in the case of such animals as sheep or cattle which have no upper anterior incisors. As conductive to a clearer understanding of this invention it may be here pointed out that the useful life of a grazing animal such as a cow depends in large part upon the useful life of the anterior lower incisors of the animal. A cow, for example, possesses only eight teeth on her lower front jaw, which eight permanent teeth serve to crop the grass while the back upper and lower molars masticate the food. If the animal grazes upon loose sandy or gritty soil these anterior teeth wear down rapidly, and within a year or two will have worn down to such an extent that they are called pearlies or gummers, a pearlie or gummer being a tooth which embodies only a small part of the neck of the tooth and projects about a quarter of an inch above the gum. When the teeth reach this condition the animal is approaching the end of its useful life, because, as a calf producer and a calf feeder she is unable to obtain enough food to support herself in a healthy condition for such purpose.

When the same cow is feeding on a land of different character wherein much less of the loose gritty material is present, the animal might live productively for a much longer period of time. An object of this invention is, therefore, the provision of individual crowns adapted to be applied to the anterior lower incisor teeth of a cow which are formed of a relatively hard material such as stainless steel to preclude much of the wear or abrasion which would otherwise occur and thus prolong the useful life of a cow.

A specific object of this invention is the provision in a cap or crown of this character of an improved anchoring means, the normal shape of which corresponds to the general external contour of a natural tooth crown, the anchorage being in the form of a construction in the undercut areas of the bovine teeth which is expansible to slip over the widest circumference of the teeth and then automatically through its natural spring action conforming into the undercut or narrower portions of the natural tooth, thus eliminating much of the time and labor which has heretofore been needed to anchor the caps or crowns of my application above mentioned to animal teeth.

An additional object of the invention is the provision of anchoring means of the character which tend to eliminate gum irritation and the food catching edges of the anchoring means hitherto employed.

Still other objects reside in the combinations of elements, arrangements of parts, and features of construction, all as will be more fully pointed out hereinafter and disclosed in the accompanying drawings wherein there is shown a preferred embodiment of this inventive concept.

In the drawings:

FIGURE 1 is a rear elevational view showing a plurality of crowns of the instant invention as applied to three of the lower anterior incisor teeth of a cow or similar animal.

FIGURE 2 is a side elevational view of one of the crowns of FIG. 1 as removed from the tooth.

FIGURE 3 is a front elevational view of the crown of FIG. 2.

FIGURE 4 is a bottom plan view of the crown of FIGS. 2 and 3; and

FIGURE 5 is an enlarged sectional view taken substantially along the line 5—5 of FIG. 1 as viewed in the direction indicated by the arrows.

Similar reference characters refer to similar parts throughout the several views of the drawing.

Having reference now to the drawing in detail, the crown of the instant invention is generally indicated at 10, and comprises a straight front portion 11 which fits over the anterior frontal portion 12 of the tooth T (see FIG. 5). Straight portion 11 merges into an arcuate inwardly concaved portion 13 which is adapted to engage the normally undercut portion 14 of the tooth. The top 15 of the crown 10 comprises an inclined integral top plate, of relatively thick material, which serves as a complete protection for the biting surface of the tooth. The crown 10 also includes an arcuate rear portion 16, which includes an undercut flange 17, which engages the rear undercut portion of the tooth T, thus serving firmly to hold the crown 10 in position on the tooth after application. The opposite side walls 18 of each crown 10 are provided with V-shaped frontal slots 19 adjacent the curved lower portion 13, and with relatively widened V-shaped slots 20 positioned rearwardly along the side walls. The slots 19 and 20 define between them a side flap 21, which is inwardly curved as at 22 to engage the undercut side portions of the tooth, while the flange 17 extends inwardly to the points 23 adjacent the rear portion of the V-shaped slots 20. The arrangement is thus such that due to the inherent resiliency of the metal so conformed the crown 10 after once being applied over an individual tooth will tend to retain itself in position by virtue of the natural resiliency of the components. It is to be pointed out that in the normal application of the teeth suitable dental adhesive 25 is provided on the exposed surfaces of the tooth T, and the crown 10 then positioned over the adhesively covered tooth by moving the front and rear portions thereof away from each other to permit engagement over the maximum diameter of the tooth T and then moving them back toward each other to hold the crown 10 in position by the above referred to resiliency until the adhesive has thoroughly hardened. After this hardening has once been effected to the cap or crown 10 is permanently secured to the animal's tooth, and will remain in position normally for the lifetime at the animal, although it may be removed in the event of disease or decay of the tooth necessitating such removal. Under normal conditions, however, such removal is unnecessary throughout the life of the animal.

From the foregoing it will now be seen that there is herein provided an improved crown or cap for bovine teeth which may be readily applied to the lower anterior incisor teeth of a cow or the like, and which through its normal resilient construction will be retained in position during such time as the adhesive is hardening to permanently secure the crown of the tooth, and which accomplishes all of the objects of this invention, and others, including many advantages of great practical utility.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. A crown for an anterior tooth of a grazing animal, said crown having a top face, a front wall including a lower inwardly concave portion adapted to engage the undercut portion of the tooth, the rear portion having a lower arcuate flange adapted to engage the rear undercut portion of a tooth, and side wall portions curving inwardly at their bottoms to define a crown closely engageable about the tooth, said side walls being resiliently expansible to permit the concave portion of the front wall to snap over the maximum diameter portion of the tooth.

2. A crown for an anterior tooth of a grazing animal, said crown having a top face, a front wall including a lower inwardly concave portion adapted to engage the undercut portion of the tooth, the rear portion having a lower arcuate flange adapted to engage the rear undercut portion of a tooth, and side wall portions curving inwardly at their bottoms to define a crown closely engageable about the tooth, said side walls being resiliently expansible to permit the concave portion of the front wall to snap over the maximum diameter portion of the tooth, the expansibility of said side walls being provided by slots cut in each wall and open adjacent the open bottom of the tooth.

3. A crown for an anterior tooth of a grazing animal, said crown having a top face, a front wall including a lower inwardly concave portion adapted to engage the undercut portion of the tooth, the rear portion having a lower arcuate flange adapted to engage the rear undercut portion of a tooth, and side wall portions curving inwardly at their bottoms to define a crown closely engageable about the tooth, said side walls being resiliently expansible to permit the concave portion of the front wall to snap over the maximum diameter portion of the tooth, the expansibility of said side walls being provided by slots cut in each wall and open adjacent the open bottom of the tooth, each slot being in the shape of an interted V.

4. A crown for an anterior tooth of a grazing animal, said crown having a top face, a front wall including a lower inwardly concave portion adapted to engage the undercut portion of the tooth, the rear portion having a lower arcuate flange adapted to engage the rear undercut portion of a tooth, and side wall portions curving inwardly at their buttoms to define a crown closely engageable about the tooth, said side walls being resiliently expansible to permit the concave portion of the front wall to snap over the maximum diameter portion of the tooth, the expansibility of said side walls being provided by slots cut in each wall and open adjacent the open bottom of the tooth, each slot being in the shape of an inverted V, there being a plurality of slots in each side wall.

5. A crown for an anterior tooth of a grazing animal, said tooth having a top, a front, a rear, oppositely disposed sides, a maximum diameter portion and an undercut portion, said crown comprising a top face portion for extending over the top of the tooth and a depending wall portion including a front wall portion depending from, and extending inwardly relative to, said top face portion and a rear wall portion depending from, and extending inwardly relative to, said top face portion, said front and rear wall portions being adapted to engage the front and rear undercut portion of the tooth, said depending wall portion being divided longitudinally on each side of the tooth to permit said front and rear wall portions to be movable toward and away from each other for clampingly engaging said crown over the maximum diameter portion of the tooth.

References Cited in the file of this patent
UNITED STATES PATENTS

| | | |
|---|---|---|
| 1,519,969 | Bechtold | Dec. 16, 1924 |
| 3,046,657 | Menter et al. | July 31, 1962 |
| 3,055,109 | Newcomb | Sept. 25, 1962 |